US009223784B2

(12) United States Patent
Gormish et al.

(10) Patent No.: US 9,223,784 B2
(45) Date of Patent: Dec. 29, 2015

(54) METHOD AND APPARATUS FOR ARCHIVING MEDIA USING A LOG

(75) Inventors: Michael Gormish, Redwood City, CA (US); Peter E. Hart, Menlo Park, CA (US)

(73) Assignee: RICOH, CO., LTD., Tokyo (JP)

( * ) Notice: Subject to any disclaimer, the term of this patent is extended or adjusted under 35 U.S.C. 154(b) by 1839 days.

(21) Appl. No.: 11/692,815

(22) Filed: Mar. 28, 2007

(65) Prior Publication Data

US 2008/0243753 A1 Oct. 2, 2008

(51) Int. Cl.
*G06F 17/30* (2006.01)
*G06F 7/00* (2006.01)

(52) U.S. Cl.
CPC .... *G06F 17/30044* (2013.01); *G06F 17/30011* (2013.01); *G06F 17/30023* (2013.01)

(58) Field of Classification Search
None
See application file for complete search history.

(56) References Cited

U.S. PATENT DOCUMENTS

| | | | | | |
|---|---|---|---|---|---|
| 5,563,997 | A | * | 10/1996 | Fisher | 715/809 |
| 5,574,898 | A | * | 11/1996 | Leblang et al. | 1/1 |
| 6,044,381 | A | | 3/2000 | Boothby | |
| 6,324,555 | B1 | * | 11/2001 | Sites | 715/234 |
| 6,601,172 | B1 | * | 7/2003 | Epstein | 713/178 |
| 6,662,186 | B1 | * | 12/2003 | Esquibel et al. | 1/1 |
| 6,741,743 | B2 | * | 5/2004 | Stalcup et al. | 382/217 |
| 6,848,048 | B1 | * | 1/2005 | Holmes | 713/162 |
| 7,149,760 | B1 | * | 12/2006 | Breuer | 1/1 |
| 7,409,557 | B2 | * | 8/2008 | Teppler | 713/178 |
| 7,660,798 | B1 | * | 2/2010 | Ludwig et al. | 713/165 |
| 7,860,317 | B2 | * | 12/2010 | Xie et al. | 382/195 |
| 7,930,540 | B2 | * | 4/2011 | Ahuja et al. | 713/167 |
| 2003/0120729 | A1 | * | 6/2003 | Kim et al. | 709/203 |
| 2003/0120740 | A1 | * | 6/2003 | Beeman et al. | 709/213 |
| 2004/0006692 | A1 | * | 1/2004 | Honda et al. | 713/157 |
| 2004/0049521 | A1 | * | 3/2004 | Borrowman | 707/104.1 |
| 2005/0015461 | A1 | * | 1/2005 | Richard et al. | 709/217 |
| 2005/0165828 | A1 | * | 7/2005 | Lango et al. | 707/102 |
| 2006/0010095 | A1 | * | 1/2006 | Wolff et al. | 707/1 |
| 2006/0288185 | A1 | * | 12/2006 | Brisse et al. | 711/170 |
| 2007/0115980 | A1 | * | 5/2007 | Aaron et al. | 370/392 |
| 2008/0154905 | A1 | * | 6/2008 | Paalasmaa et al. | 707/10 |

FOREIGN PATENT DOCUMENTS

EP 0 443 972 8/1991

OTHER PUBLICATIONS

European Search Report, Application No. 08153379.6-1225, Mailed Aug. 11, 2008.
Chen, et al., "ECF—Event Correlation for Forensics," Internet Citation, [Online], Nov. 25, 2003, XP002441540.
Li, Tao, et al, "An Integrated Framework on Mining Logs Files for Computing System Management," Industry/Government Track Poster, Aug. 21-24, 2005, pp. 776-781.

* cited by examiner

*Primary Examiner* — Charles Rones
*Assistant Examiner* — Charles Adams
(74) *Attorney, Agent, or Firm* — Blakely, Sokoloff, Taylor & Zafman LLP

(57) ABSTRACT

Method and apparatus for archiving media using a log are described. In one embodiment, the method comprises accepting an original media; updating a first log to include an indication that specifies a date of when the original media was received; converting the original media into a bitmap, the bitmap being in a format different than that of the media; updating a second log with an entry that specifies a relationship between the original media and the bitmap indicating that they are related, wherein the entry includes an identifier corresponding to the entry and an identifier corresponding to the media.

17 Claims, 17 Drawing Sheets

FIG. 5A
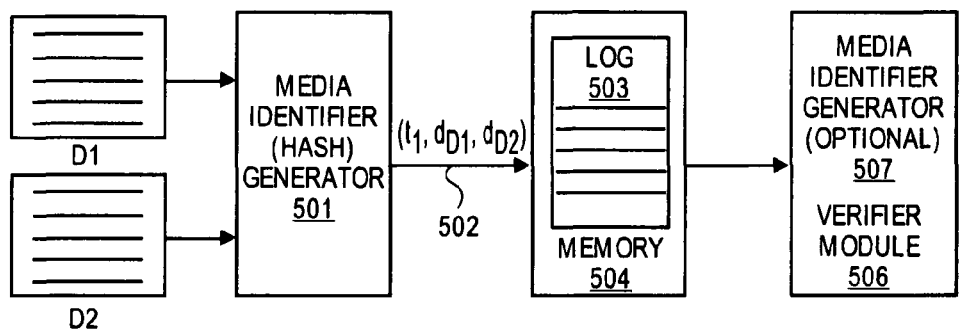
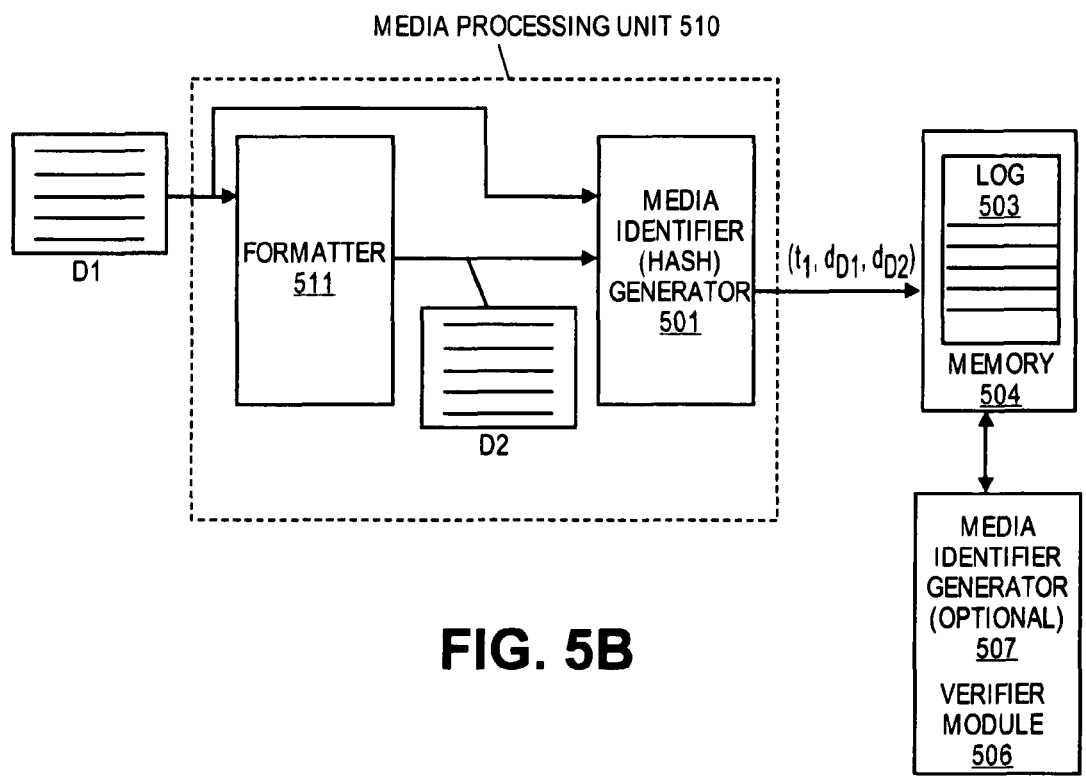
FIG. 5B

METHOD AND APPARATUS FOR ARCHIVING MEDIA USING A LOG

FIELD OF THE INVENTION

The present invention relates to the field of digital object distribution; more particularly, the present invention relates to associating information using document logs.

BACKGROUND OF THE INVENTION

Many document management systems have been proposed and implemented in the past. These document management systems include systems that store documents and handle the coordination of requests with responses. However, these systems do not cur across organizational boundaries and do not perform the synchronization that is necessary.

A Web log is an online document management tool used to record information. Web logs use a client-server framework to permit the addition or subtraction of content from one or more client locations to a server that hosts the web log. Because one server hosts each web log, web logs are typically anchored to a particular HTTP location.

U.S. patent application Ser. No. 10/887,998, entitled "Synchronizing distributed work through document logs," filed Jul. 9, 2004 by Wolff, Gregory J.; et al., (Publication No. 20060010095) discloses synchronizing distributed work through the use of document logs. As disclosed, metadata entries are added to a set that is associated with a digital object, such as a document. The metadata entries are accessed using unique identifiers that reference the metadata entries. In one embodiment, each unique identifier is based on the contents of the metadata entry.

SUMMARY OF THE INVENTION

Method and apparatus for archiving media using a log are described. In one embodiment, the method comprises accepting an original media; updating a first log to include an indication that specifies a date of when the original media was received; converting the original media into a bitmap, the bitmap being in a format different than that of the media; updating a second log with an entry that specifies a relationship between the original media and the bitmap indicating that they are related, wherein the entry includes an identifier corresponding to the entry and an identifier corresponding to the media.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5A illustrates creating an entry in a log that used to represent an association between two pieces of media that are related.

FIG. 5B illustrates a server or other computing device has all the pieces of media and computes many identifiers for the different subsets of data.

Referring to FIG. 11, three sets of one or more processing operations 1101-1103 are shown in a cascaded arrangement.

DETAILED DESCRIPTION OF THE PRESENT INVENTION

Figure 1:
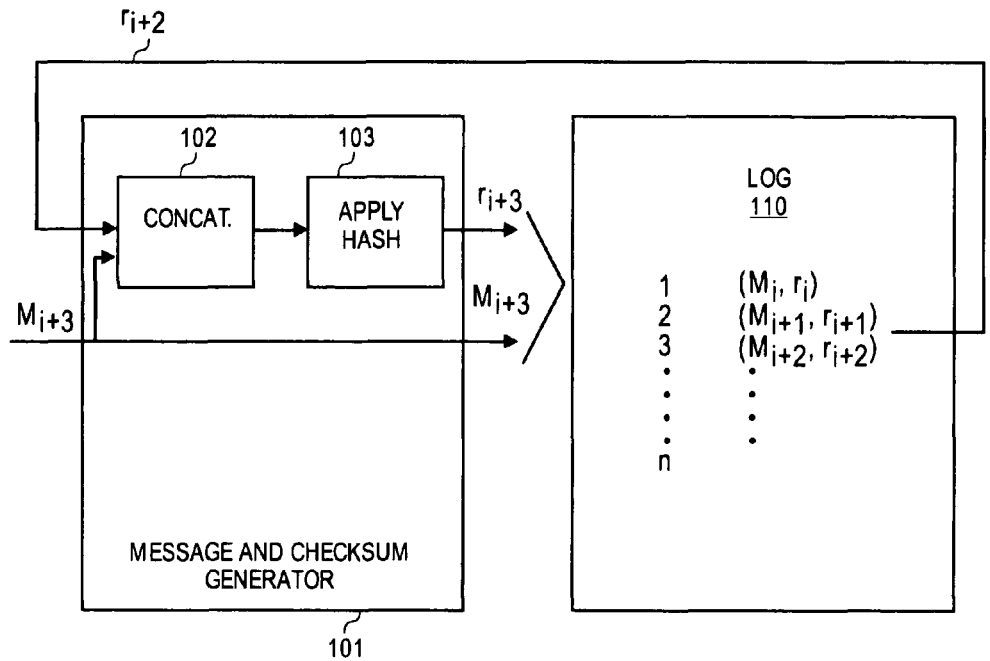
FIG. 1 illustrates generating and storing an entry in a log.

A method, apparatus, and article of manufacture for archiving bitmaps and other images using logs are disclosed. In other words, logs and the logging techniques described herein may be used to record a relationship between a bitmap and another version of the information in the bitmap. This may be performed using one or more media identifiers that correspond to the bitmap and the other version.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Media Identifiers, Sequential Logs, and Entangling Media Identifiers for Physical and Electronic Items Many of the inventions described here-in require the ability to refer to a document, video, song, piece of paper, or electronic file by an identifier. For purposes herein, the document, video, song, piece of paper, or electronic file is referred herein to as the media. An identifier used to identify the media is called a media identifier and, in one embodiment, is a string of bytes.

There are several properties of the association between the media and the media identifier which are useful in the inventions: A) it is beneficial that anyone who has the media can determine an identical media identifier; B) it is beneficial that it is difficult for anyone to find two distinct pieces of media that have the same media identifier; C) it is beneficial that the media identifier does not reveal anything about the content of the media; and D) it is beneficial that any change to the media would result in a different identifier.

There are multiple ways to assign an identifier to a piece of media. For an electronic file, in one embodiment, the identifier is generated by applying a cryptographic hash function on the bytes of the file. Cyptographic hash functions are well known in the security literature and have been standardized in various federal and international standards, and software toolkits.

Cryptographic hash functions meet the properties described above so well that we will sometimes refer to the process of determining an identifier for a piece of media as "hashing" and sometimes refer to the media identifier as a "hash," even if a different technique is used to form the identifier.

There are other ways to assign identifiers to files. For example, a server could keep a copy of every file and assign a previously unused string randomly to each new file. This method works very well for properties B, C, and D, but only meets property A if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties A and C, but not property B. Some changes result in a different checksum but a few do not, so property D is not always met. However, for some applications these properties may be less important. Also some applications may have very structured data, such that it is difficult to find two pieces of media that both have the same checksum and follow the rules of the structured data.

Pieces of paper can be assigned an identifier, for example, by scanning the paper and computing a cryptographic hash of the scanned file that results. However, because of noise in the scanning process, different scans of the paper often lead to different electronic files, and thus different identifiers. For this reason it is sometimes convenient to affix a barcode or other machine readable identifier (e.g., a RFID tag) to a piece of paper or other physical device. Use of a machine readable ID makes it easy for anyone to get the same identifier; however, it is also possible to attach the same ID value to different media, so property B is not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties C and D might not be held perfectly.

There may be multiple identifiers associated with a single piece of media. For example, there could be an identifier formed by using the SHA1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

There can be identifiers associated with different formats of the same data. For example, the hash of a file, and the hash of the same file compressed losslessly with ZIP, are different identifiers, but they are associated with the same final data.

There can also be identifiers formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions, in this case no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and it's source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, this may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the inventions described herein involve recording a sequence of events. The record of events is referred to as a "log" or "log-file," similar to the relationship with a log book used to record the events of a ship or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper proof write once memory. Each record is written in order into the memory. This meets the goal of easy to add and hard to modify, but it is difficult to remotely verify that the "tamper proof" memory has not been changed.

One method of implementing a log is to create a sequence of records where each record includes a hash of some information from the previous record, and the contents of the current record. For example, let the message portion of the ith record be called $M_i$ and a rolling checksum called $r_i$. This rolling checksum for the ith record can be computed as:

$$r_i = \text{hash}(r_{i-1}.M_i)$$

where the message and the previous checksum are concatenated (represented by the ".") and provided to the hash function. The log in this case consists of a sequence of messages and checksums $(M_i, r_i)$. In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then the subsequent checksum will be incorrect. Thus modifying a record would require changing the message and all subsequent checksums. If one of the checksums is copied and stored elsewhere, then any modification prior to that checksum can be detected. If a modification is made without updating the checksums, then recomputing the hashes for the rolling checksums in the log reveals the error. If the hashes are all changed so the log is self consistent, then they won't match the externally saved value.

As set forth above, the hash function could be a simple checksum, be preferably is a cryptographic hash function.

This method meets most of the goals for the log, but there are variations which provide additional benefits.

One modification is to store the hash of the message rather than the message itself in the log. Thus, if $m_i$ is defined as:

$$m_i = \text{hash}(M_i),$$

then a log can be defined as a sequence of $(m_i, r_i)$, with $r_i$ being a checksum of only the message hash and the previous checksum:

$$r_i = \text{hash}(r_{i-1}. m_i).$$

Figure 2:
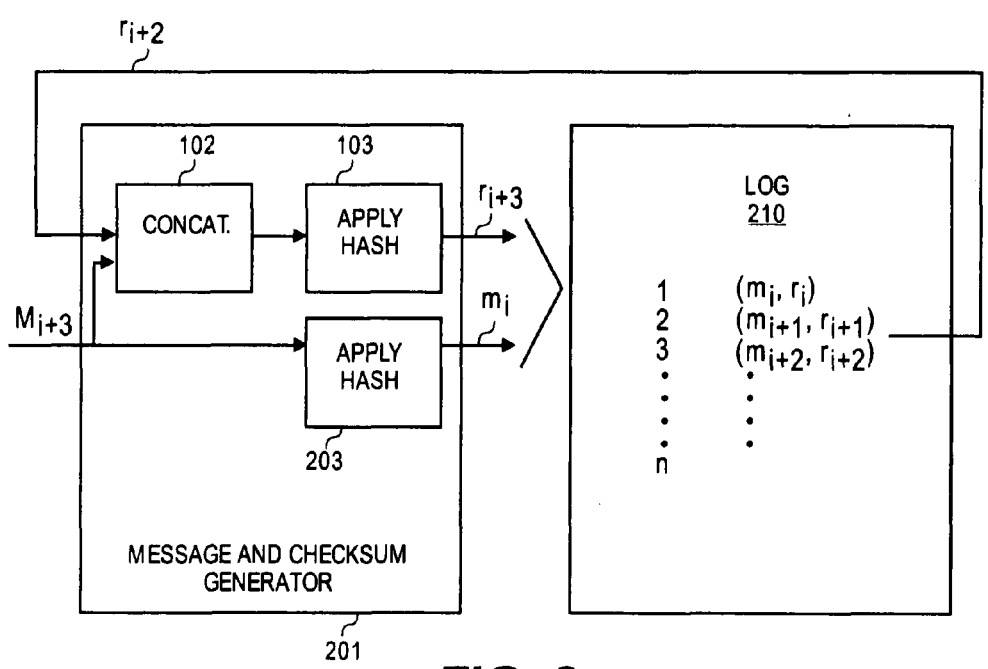
FIG. 2 illustrates generating and storing a hash of media in a log.

This is shown in FIG. 2. Referring to FIG. 2, to create a new message and checksum pair, a message and checksum generator 201 receives a new message, $M_{i+3}$ and the checksum $r_{i+2}$ of the last entry in log 210. A concatenation module 102 concatenates the previous checksum $r_{i+2}$ with the message $M_{i+3}$. Hash module 103 applies a hash function, as described herein, to produce the next checksum $r_{i+3}$. Hash module 203 applies a hash function to message $M_{i+3}$ to produce hashed message $m_{i+3}$. In one embodiment, the hash function applied by hash module 203 is the same as the hash function applied by hash module 103; alternatively, the hash function applied by hash module 203 is not the same as the hash function applied by hash module 103. Hashed message $m_{i+3}$ and checksum $r_{i+3}$ are then stored in log 210. Message and checksum generator 101 may comprise a processing unit (e.g., a microprocessor) with concatenation module 102, hash unit 103, hash unit 203 being software modules of instructions that are executed by the processing unit. Alternatively, these functions could be implemented in hardware.

This method has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without publishing this information.

In some cases, it is desirable to have a log with more information than solely the hash of the message. For example, it is often useful to have the time stored in the log or the type of information of the log entry stored in the published log. This makes it easier to search the log for specific records. Thus, if the information in a record that is readable is defined as the "plain text", called $t_i$, then in one embodiment, the log consists of a sequence of $(t_i, m_i, r_i)$, and each checksum, $r_i$ is computed as:

$$r_i = \text{hash}(r_{i-1}, t_i, m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.
Author: gormish
SHA1: 1bff5d8cda307b5f3f3757cb25588a54cfb01ceO0
Content-Length: 567
567 bytes of DATA In one embodiment, this type of format is used for http and email. Thus, several well-known headers have been defined and could be used in a log.

Different keys can be used for different encrypted entries or different types of encrypted entries in the log. For example, all entanglement information might be encrypted with one key, all classification values with a different key. If the log is associated with a single document and that document is encrypted, then the entries in the log might be encrypted with the same key as used for the document. That way, anyone with access to the document is also granted access to the information in the log.

In one embodiment, a log supports different multiple rolling hashes or different types of hashes, i.e. hashes computed with different cryptographic hash functions. For example, in one embodiment, the value $r_i$ is as follows:

$$r_i = \text{hash}(r_{i-1}, t_i, m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, S_i)$$

where $r_i$ is computed as:

$$r_i = SHA1(r_{i-1}, t_i, m_i)$$

and $s_i$ is computed as:

$$s_i = SHA256(s_{i-1}, t_i, m_i)$$

This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes $(M_i, r_i)$, with ri=SHA1(ri−1, Mi), with i between 1 and N. New messages can be added to the log which consists of the old messages and a new rolling hash computed with a different hash function. Thus, message N+1 could be the first message concatenated with a rolling checksum computed using a new hash function. In general:

$$M_{N+1} = M_i, s_i$$

where $$s_i = SHA256(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = SHA256(s_{i-1}, t_i, m_i, r_i)$$

or $$s_i = SHA256(r_{i-1}, S_{i-1}, t_i, m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log is for a single document that does not have too many entries.

In some cases, the log may become very long, usually because a record of a common event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the mathematical methods of insuring that events occur in sequence, in one embodiment, a physical tamper proof device is used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Entangling

Because it is relatively easy to modify a single log, in one embodiment, information is exchanged between logs in such away that modification of the entries in one log can be detected by examining another log. It is important to store information in the second log that depends on all of the information in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records are longer than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called entangling because after storing information from one log in another, all future rolling checksums in the second log depend on the information in the first log.

In one embodiment, the log being used is storing pairs of message hashes and rolling hashes, i.e. $(m_i, r_i)$, and the message hash for an entry in the second log is replaced by the rolling hash from the first log. Thus, all rolling hashes after that entry in the second log depend on the rolling hash from the first log.

While this is the simplest embodiment, the limited amount of information stored when entangling, can make it difficult to determine what the nature of the entanglement is. Thus, in one embodiment, additional information is included in the log entry used for entanglement. For example, those logs using a type value can set the type to indicate that the data is not a "regular message" but an "entanglement entry." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
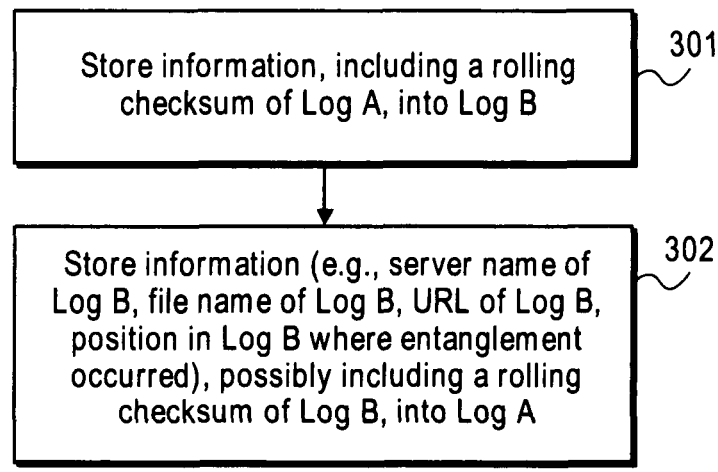
FIG. 3 is a flow diagram of one embodiment of a process for entangling a pair of logs.

In many case, it is desirable to determine which logs depend on a first log. In order to facilitate this, information can be stored in both logs when an entanglement is made. FIG. 3 is a flow diagram of one embodiment of a process for entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored, the entanglement is both from log B to log A and from log A to log B.

Verification Procedure

In many situations, it is necessary to determine if a log has been modified since it was created. This is best done by software, computer systems, and people independent from the log generation hardware, software, and people.

In one embodiment, to determine if a log is self consistent, verification software (such as in a computer system of FIG. 18 or dedicated machine) recomputes the rolling hash for each entry in the log. If the rolling hash computed by the verification software matches the rolling hash stored in the log, then that entry has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is stored (entangled) in another log. The entries in the second log must be self consistent before and after the entanglement entry.

An Example of an Entangling Detection Procedure

Figure 4:
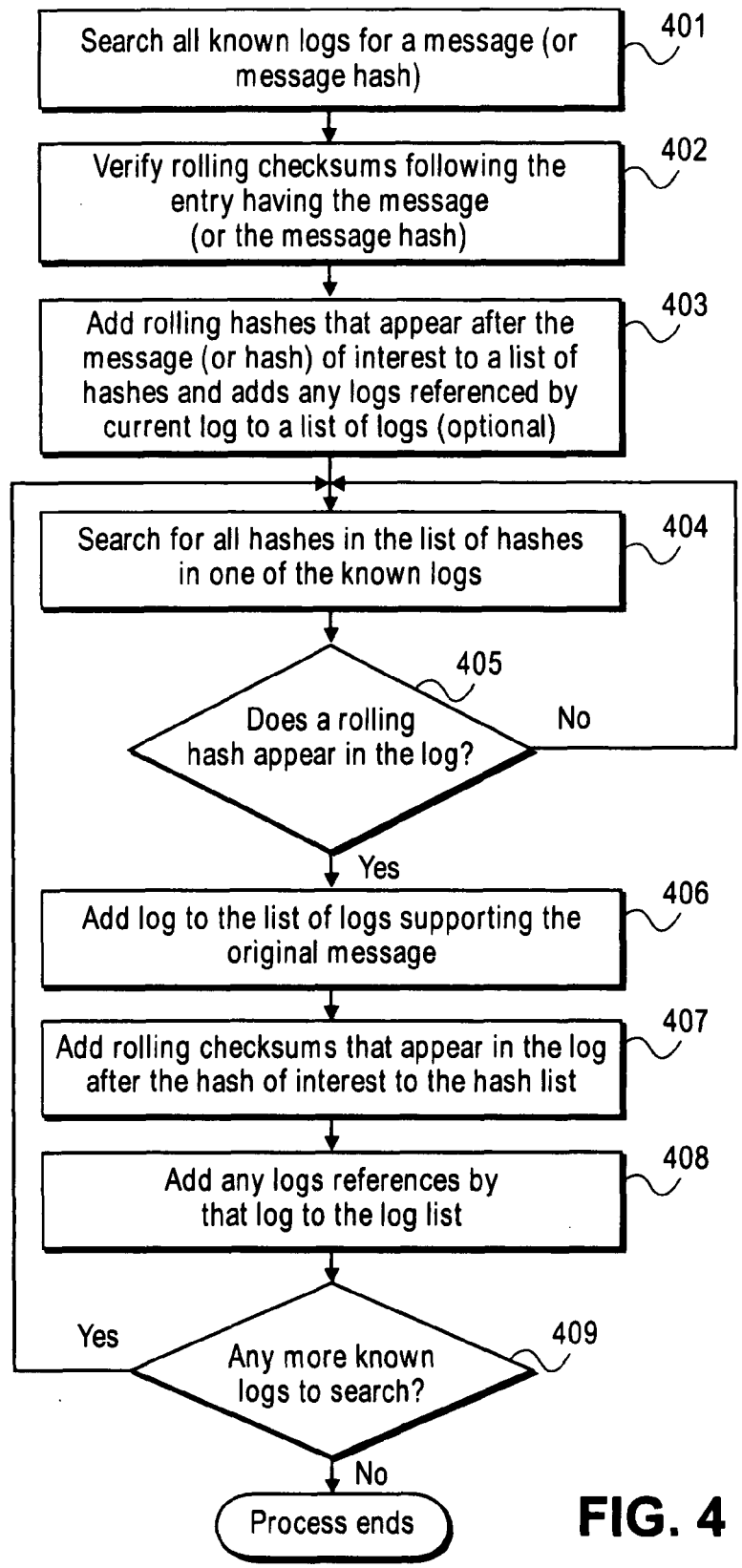
FIG. 4 is a flow diagram of one embodiment of a process for performing entanglement detection.

If a third party wishes to determine the validity of a message stored in a log some time after the entry was made and entangled with other logs, entanglement detection allows all servers which have entries that are consistent with the message to be determined. FIG. 4 is a flow diagram of one embodiment of a process for performing entanglement detection. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that hasn't been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then someone verifying the logs will have more confidence that the log has not changed. This benefit of entangling with different devices means that the logs should be able to store addresses of entangled logs that cross company and device boundaries. One way to do this is to use a URL to identify a log.

The python source code below determines logs that confirm the message hash in another log. This source code is designed to work for a particular form of log that doesn't contain references to other logs. Thus, it only finds evidence in the logs it initialized to check and new hashes are searched for only in the known logs. The source code is designed to access logs from multiple independent http servers. The source implementation currently uses only one log per sever, but the URLs could be modified to allow multiple logs per server.

The following sample software may be used to determine valid entanglements:

```
"""
Program to examine a set of servers for a given hash or file, then look for the hash chains
leading from that document to other servers.
"""
import sys
from Crypto.Hash import SHA256
import urllib
from optparse import OptionParser
parser = OptionParser( )
parser.add_option("-f", "--file", dest="filename",
                    help="Find servers who know about file", metavar="FILE")
parser.add_option("--hash", dest="hash",
                    help="Find servers who know about hash")
parser.add_option("-q", "--quiet",
                    action="store_false", dest="verbose", default=True,
                    help="don't print status messages to stdout")
(options, args) = parser.parse_args( )
hashlist = ( )
if options.hash:
    hashlist.append(options.hash)
if options.filename:
    try:
        f = open(options.filename,"rb")
        hf = SHA256.new( )
        blocksize = 32*1024
        while True:
            data = f.read(blocksize)
            hf.update(data)
            if len(data) < blocksize:
                break
        hashlist.append(hf.hexdigest( ))
    except IOError:
        print "Could not process file: %s" % options.filename
if len(hashlist) == 0:
    print "No hash or file supplied"
    parser.print_help( )
    sys.exit( )
unconnectedserverlist = ['http://localhost:9001/',
                        'http://localhost:9002/',
                        'http://localhost:9003/',
                        'http://localhost:9004/',
                        'http://localhost:9005/']
serverstatus = { } # what is the condition observed on each server
#List of servers that have a chain to the document in question
foundlist = ( )
#Evidence for each rolling hash
#Dictionary with rolling hash: key is hash, value is log entry that hashes to that key
```

```
evidencelist = { }
while( len(hashlist)> 0 and len(unconnectedserverlisr) >0):
    #For the next hash, search the unconnected servers
    searchhash = hashlist.pop(0)
    for server in unconnectedserverlist:
        devicelog = SHA256.new(server).hexdigest( )
        url = server + 'log?logUID=%s&messagehash=%s' % (devicelog,searchhash)
        try:
            if options.verbose:
                print "Trying url: " + url
            result = urllib.urlopen(url)
            #want a sequence number so I can get stuff after this, or a way to ask for all
checksums after the found event
        except IOError:
            continue
        line = result.readline( ) # we only check the first line which should be lowest sequence
number
        if (line.find('No Entries') >= 0): #Depends on way empty results are returned
            continue
        #split into (type,message,rchecksum)
        (seq,type,message,rchecksum) = line.split(':')
        if (searchhash != message):
            print "Error Server %s returned a match for %s that didn't match. Returned value: %s
message %s len1 = %d len2 = %d" % (server, searchhash, line,message,len(searchhash),len(message))
        else:
            if options.verbose:
                print "Adding found server: " + server
            foundlist.append((server,seq,message)) # Yea! # in the end we may want the whole
chain!
            serverstatus[server] = "Found Document or Hash Chain to Document"
            unconnectedserverlist.remove(server)
            # we want to get a previous hash for confirmation
            if int(seq) >0:
                seq = str(int(seq) −1 )
            else:
                print "Warning we will miss an item!"
            url2 = server + 'log?sequence=%s-&logUID=%s' % (seq, devicelog)
            try:
                if options.verbose:
                    print "Trying url: " + url2
                result2 = urllib.urlopen(url2)
            except IOError:
                continue
            #Add all rolling hashes from the message entanglement on to the hash list (if they
verify)
            data = result2.readlines( )
            line2 = data[0]
            data = data[1:]
            (seq2,type2,message2,rchecksum2) = line2.split(':')
            prevchecksum = rchecksum2[0:64]
            for line2 in data:
                (seq2,type2,message2,rchecksum2) = line2.split(':')
                rchecksum2 = rchecksum2[0:64] # drop new line
                # test rchecksum2
                testentry = prevchecksum + '\n'+ type2 + ':' + message2 + ':'
                confirmchecksum = SHA256.new(testentry).hexdigest( )
                if confirmchecksum != rchecksum2:
                    print "Failed to confirm checksum on server %s, seq %s" % (server, seq2)
                    print testentry,len(testentry),confirmchecksum,rchecksum2
                    serverstatus[server] = 'ERROR IN HASH CHAIN'
                    break #do not add any checksums past the bad data
                evidencelist[rchecksum2] = testentry
                prevchecksum = rchecksum2
                if options.verbose:
                    print "Adding hash to search for: " + rchecksum2
                hashlist.append(rchecksum2)
if options.verbose:
    print "\n\nFound a Log Chain to the following servers:"
    print foundlist
    print "\nEvidence"
    print evidencelist
print "\n\nServer reports for given hash"
for i in serverstatus.keys( ):
    print i, serverstatus[i]
```

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier.

Authentication via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used to as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system (e.g., perhaps a message is stored when a deposit is made to an account). Subsequently, when it is desired to make a withdrawal from the account, the system could ask for the rolling hash used to make the deposit. If more security is desired, in one embodiment, the system asks for information about that rolling hash (e.g., the hash of that rolling hash and a challenge string). The system could ask for several pieces of information about a previous interaction, that could only be answered by someone in possession of the log.

Associations

Logs and the techniques described above may be used to record many different types of associations. More specifically, an entry in a particular log may indicate that two pieces of media are related to each other. One association that may be desirable to make is to indicate two different media are different versions, e.g. one is an updated version of the other. Different versions of a document or other media will have different hashes or media identifiers because the content is different. However, in certain applications, it is important to be able to associate the different versions. A different version of a document may include a document that doesn't change content but had its formatting changed, e.g. converting a tiff file to a JPEG file, or rendering an HTML document to PDF, or converting an mp3 to AAC. In other cases, a different version could have significantly different content (e.g., an edited document, a second recording of a song, or a cropped and white-balanced image). In still other cases, versions could be different only because of metadata changes (e.g., an copyright tag was added to an mp3 file, or some information about colorspace was deleted from an image file). Two different scans of the same paper document might be considered to be different versions. In all cases, the question of whether two documents are different versions of the same thing depend on the application. In some applications, the answer will be subjective, while in others it can be decided based on some objective criteria. The log need not explicitly state that two documents are the different versions, rather it could indicate the relationship, e.g. different scans of a common paper document. Then some applications will access the log and consider those the same document, while other applications might consider them different documents. In one embodiment, a log may be used to associate both versions of the media and in many cases treat them as the same media. However, in certain applications where the validity of an media e.g. an image is maintained, it is important to know that the content was not changed apart from the format conversion. Thus, in such a case, not only is it important to know that two pieces of media are related, but also that the differences between the versions are limited to that of format changes.

In one embodiment, entries in a log indicate that two media are related in some manner. The relationship may be that they have equivalent content. FIG. 5A illustrates creating an entry in a log that represents an association between two pieces of media that are related. Referring to FIG. 5A, two documents D1 and D2 are input into media identifier generator 501. Document D2 is a different version of document D1. Media identifier generator 501 generates a media identifier for each of documents D1 and D2 as described above, which are referred to herein as media identifiers $d_{D1}$, and $d_{D2}$, respectively. Media generator 501 generates an entry 502 that includes both media identifiers $d_{D1}$, and $d_{D2}$ corresponding to document D1 and D2, respectfully, along with a type indicator $t_i$ that indicates the two media identifiers $d_{D1}$ and $d_{D2}$ are media identifiers for two pieces of media that are different versions of the same document. Entry 502 is stored in an entry of log 503, which is stored in memory 504.

Subsequently, a verification module 506 receives, as an input, one or both of documents D1 or D2 as part of a request to determine if the two are related. In the case where both are input, a media identifier generator 507 generates media identifiers for both and verification module accesses and searches log 503 for one or both of the media identifiers. Verification module 506 locates entry 502, examines the type indication, and is able to provide an output indicating the two pieces of media are the same. Alternatively, verification module 506 receives media identifiers for both and searches log 503 as described above. In such a case, media identifier generator 507 is not necessary. In another embodiment, verification module 506 receives a request for another version of a document. In such a case, verification module 506 receives a document, such as document D1 in its input, generates a media identifier for the document, and searches log 503 for an entry containing the media identifier. Verification module 506 examines all log entries having that media identifier, identifies an entry containing a related version based on the type identifier $t_1$, and obtains the media identifier for the related media. Verification module 506 can provide the media identifier for the related document as an output and/or provide the media corresponding to the media identifier (or an indication of where that media is located and/or from where the media may be accessed.

FIG. 5B is an alternative embodiment of a processing unit to handle associations. Referring to FIG. 5B, the generation of the entry using media identification generator 501 and storage into log 503 of entry 502 is the same as in FIG. 5A. However, media identifier generator 501 is part of a media processing unit 510 that receives only one piece of media, document D1, and includes a formatter 511 to generate the second piece of media, document D2, in this example. For example, formatter 511 may generate bit map images of documents. After formatting, document D2 and document D1 are input into media identifier generator 501, and an entry is generated as described above. Thus, the processing transforms the image or other media, and enters the hash of the original media and the hash of the new media in a log that asserts their equivalence.

The use of logs can be extended to record all operations that have been applied to a media. A system could perform an automatic translation of a media, following a series of steps from one to another (and these steps could be later verified if needed by examining the log). In one embodiment, the log stores a hash of an algorithm used on the media that is input. By storing this hash, and hashes of any other algorithms or processing that was applied to the media (or the output of another algorithm), an unambiguous record can be created to enable one to determine what operations the media has undergone. In one embodiment, the information input to the hash function includes algorithm source code, or an executable with some CPU information.

Multimedia Associations/Connections

In one embodiment, a log is used to record an association between two pieces of media. The two pieces of media may be slightly different versions of the same content (even without one of the pieces undergoing a reformatting operation). For example, with streaming audio-video, it is very likely that two people will see slightly different versions of the same content due to dropped frames and differences in resolutions. In such a case, several hashes may be used on portions of the media allow matches to be made between different presentations. In one embodiment, a hash of every frame, some subset of frames, or some subset of each frame (e.g., DC coefficients of a video) is generated. This allows a verification operation to determine that some of the hashes match if any common frames were received. Therefore, in one embodiment, different resolutions might still have the same hash.

Figure 6:
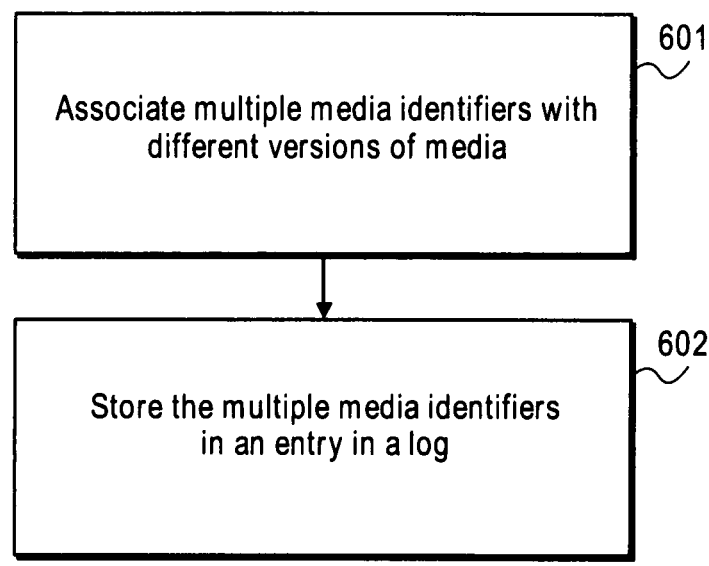
FIG. 6 is a flow diagram of one embodiment of a process for associating related media.

FIG. 6 is a flow diagram of one embodiment of a process for associating related media. The process is performed by processing logic that may comprise hardware (circuitry, dedicated logic, etc.), software (such as is run on a general purpose computer system or a dedicated machine), or a combination of both.

Referring to FIG. 6, the process begins by processing logic associating multiple media identifiers with different versions of media (processing block 601) and then storing the multiple media identifiers in an entry in a log (processing block 602). In one embodiment, the different versions of the media corresponding to two versions of a video having a different number of frames or different resolutions. In another embodiment, one media is a "subset" of another. For example, one media may be only the I-frames of video or only the portions of an XML file within a certain tag type, e.g. between '<item>' and '</item>'.

In one embodiment, a server or other computing device has all the pieces of media and computes many identifiers for the different subsets of data. An example of this is shown in FIG. 5B. Alternatively, the server or computing device merely stores, in logs, entries with multiple media identifiers that are related to each other. Based on the requests of a client or other device, the server can store hashes of the subsets with an indication (e.g., a type identifier) that the identifiers are for related pieces of media. Subsequently, those can be matched as parts of a verification process.

Figure 7:
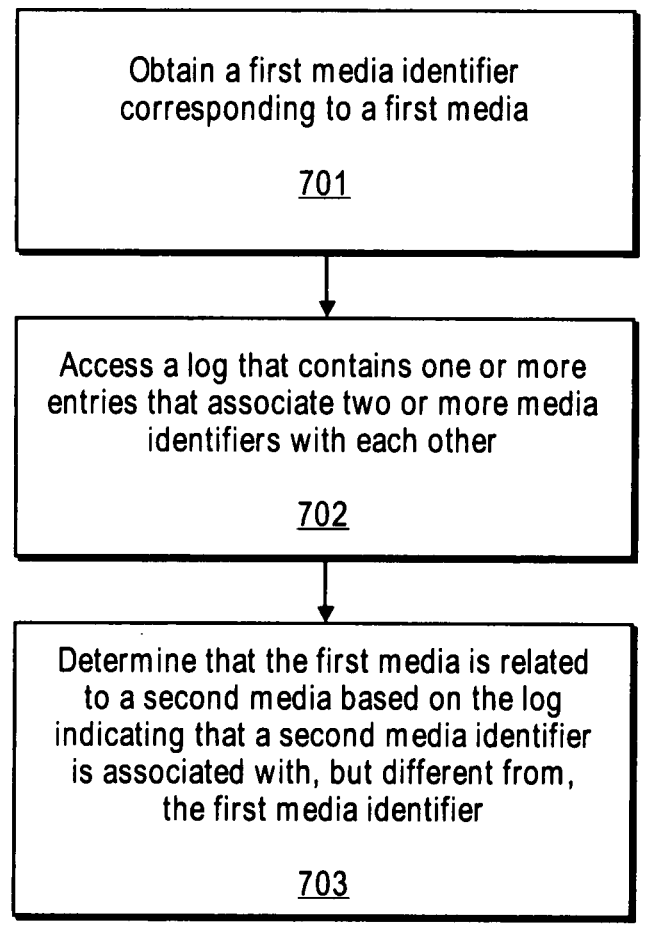
FIG. 7 is a flow diagram of one embodiment of a process for verifying a relationship between two pieces of media.

FIG. 7 is a flow diagram of one embodiment of a process for verifying a relationship between two pieces of media. The process is performed by processing logic that may comprise hardware (circuitry, dedicated logic, etc.), software (such as is run on a general purpose computer system or a dedicated machine), or a combination of both.

Referring to FIG. 7, the process begins by processing logic obtaining a first media identifier corresponding to a first media (processing block 701). In one embodiment, the first media identifier is obtained by receiving the first media identifier as an input. In one embodiment, receiving the first media identifier comprises receiving a search request containing the first media identifier. In another embodiment, the first media identifier is obtained by receiving the first media and computing the first media identifier using the first media.

In one embodiment, the first media is a document and the first media identifier is a document identifier. In one embodiment, the first media identifier is a cryptographic hash value or rolling checksum as described above. In one embodiment, the first media identifier is a result of applying a hashing function to the first media. As set forth above, the hashing function may be any hashing function such as, for example, the SHA1 cryptographic hash algorithm, the SHA256 cryptographic hash algorithm, the M5 hashing algorithm, and many other hash algorithms with the same qualities.

Processing logic also accesses a log that contains one or more entries that associate two or more media identifiers with each other (processing block 702) and determines that the first media is related to a second media based on the log indicating that a second media identifier is associated with, but different from, the first media identifier (processing block 703). In one embodiment, the first media is determined to be related to the second media by accessing a log entry in the log that contains the first media identifier, obtaining type information from the log entry, determining whether the log entry contains related media identifiers based on the type information, and obtaining the second media identifier from the log entry if the type information indicates that the log entry contains related media identifiers based on the type information.

In one embodiment, the type information is in the form of an identifier, though this is not required. The type information may be an identifier that is used to indicate that media identifiers in the entry correspond to media that are related, yet are different versions of the same media, or that one media is a different version of the other media.

In one embodiment, the first media and the second media are different versions of media, and an entry in the log indicates that the first and second media identifiers correspond to different versions of the media. In one embodiment, the first media and the second media are different frames of a video, and an entry in the log indicates that the first and second media identifiers are different subsets of the same media. In one embodiment, the first and second media are frames of a video. In one embodiment, the first media is determined to be derived from the second media based on determining that the first media is related to a second media.

A log may be used to record types of associations between media pieces other than those that are different version of the same documents. One such association is based on time. That is, a log may used to record when media pieces are related based upon some element of time. For example, in one embodiment, a log may be used to record when documents are examined together. For example, when a financial statement is prepared, a log can be created that has entries containing a record of which supporting documents were used when the financial statement was prepared. More specifically, in one embodiment, paper documents have RFID tags and the ids in those documents are stored in a hash, further, a log stores the hash of the spreadsheet being worked on and the other documents opened electronically at the same time. For purely electronic documents, regular screenshots can be made, hashed and stored in the log. These could be later used to see what was on the screen when a decision was made or an action occurred. Also, some computer tools, e.g. the Linux "lsof"(list open files) could be used to determine which files are being used at the same time and this information stored in a log, and entangled with another log to prevent later change.

Figure 8:
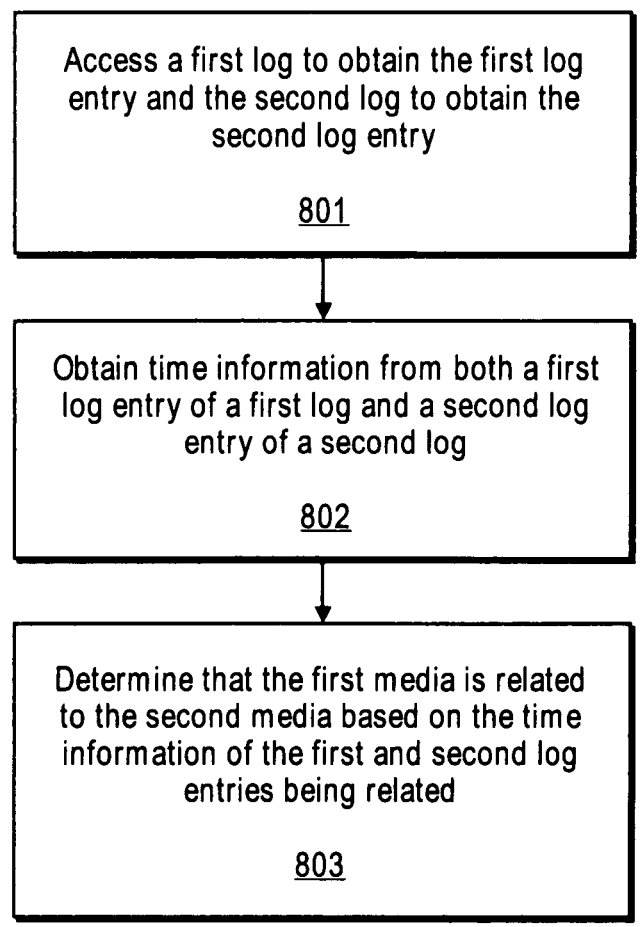
FIG. 8 is a flow diagram of one embodiment of a process for determining a relationship between media based on time information.

FIG. 8 is a flow diagram of one embodiment of a process for determining a relationship between media based on time information. The process is performed by processing logic that may comprise hardware (circuitry, dedicated logic, etc.), software (such as is run on a general purpose computer system or a dedicated machine), or a combination of both.

Referring to FIG. 8, the process begins by processing logic accessing a first log to obtain the first log entry and the second log to obtain the second log entry (processing block 801) and obtaining time information from both a first log entry of a first log and a second log entry of a second log (processing block 802). The first log entry includes a first media identifier corresponding to first media and the second log entry includes a second media identifier corresponding to second media. Note that the first and second logs could be the same log.

Next, processing logic determines that the first media is related to the second media based on the time information of the first and second log entries (processing block 803). In one embodiment, the time information of the first and second log entries is determined to be related when the time information of the first and second log entries are within a predetermined time threshold of each other (e.g., within a minute of each other). In one embodiment, the time information is related if the first and second log entries indicate that their time information is considered the same.

In one embodiment, the first media is determined to be related to the second media by determining the first media and the second media are different versions of a media. In one embodiment, the first media is determined to be related to the second media by determining the first media and the second media are different frames of a video. In one embodiment, the first media is determined to be related to the second media by determining the first media is derived from the second media.

In order to use information stored in logs and ascertain any associations based on time, the information must be captured and stored in the log. In one embodiment, a log captures a human's actions with respect to a computer. For example, a log may be used to record hashes of screen shots, information from an application like which email messages are viewed, which rows, columns, tabs are viewed, what documents were open in an application, what files are downloaded, and what applications are open for writing. In one embodiment, the capturing process includes a capture of time information as well to allow time information to be included in any entries, along with media identifiers and/or media (i.e., captured info). Furthermore, such a log, if entangled with another log, will be verifiable and enable an individual to review what human actions were taken. That is, if the log is entangled with another log, then the nature of the logs rolling hash and the entanglement with the other log prevent changes to the log from being made without being detected.

Figure 9:
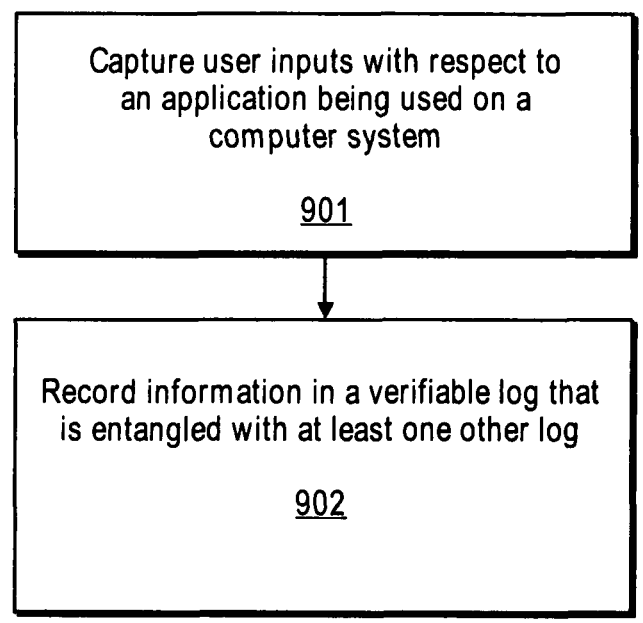
FIG. 9 is a flow diagram of one embodiment of a process for handling interactions with processing operations.

FIG. 9 is a flow diagram of one embodiment of a process for handling interactions with processing operations. The process is performed by processing logic that may comprise hardware (circuitry, dedicated logic, etc.), software (such as is run on a general purpose computer system or a dedicated machine), or a combination of both.

Referring to FIG. 9, the process begins by processing logic capturing user inputs with respect to an application(s) being used on a computer system (processing block 901). In one embodiment, capturing user inputs includes recording a hash of a screen shot, recording an email message that is viewed, recording which rows, columns, and tabs are viewed, recording a document that was open in the application, recording a file that is downloaded, or recording an application that is for writing. After capturing the information, processing logic records information in a verifiable log that is entangled with at least one other log (processing block 902).

Figure 10:
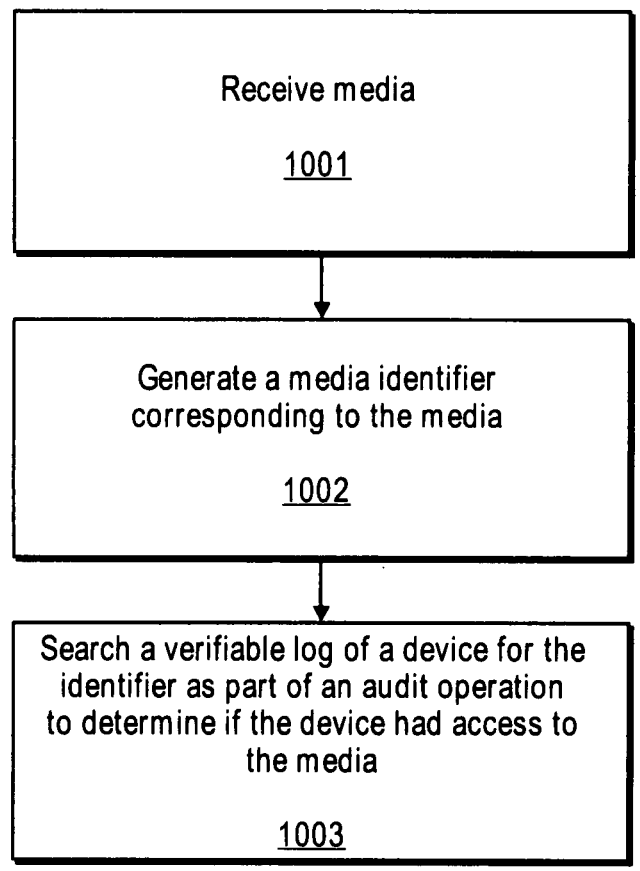
FIG. 10 is a flow diagram of one embodiment of a process for determining a relationship between a piece of media that is captured and some other data.

Subsequently, after a log has been created, by capture of information or otherwise, the associations may allow a log to be used for an audit or search for individuals who have used a particular document. This is possible where the log cannot be changed to deny documents or other portions of the log were examined. FIG. 10 is a flow diagram of one embodiment of a process for determining a relationship between a piece of media that is captured and some other data. The process is performed by processing logic that may comprise hardware (circuitry, dedicated logic, etc.), software (such as is run on a general purpose computer system or a dedicated machine), or a combination of both.

Referring to FIG. 10, the process begins by processing logic receiving media (processing block 1001) and processing logic generating a media identifier corresponding to the media (processing block 1002.) Using the media identifier, processing logic searches a verifiable log of a device for the media identifier as part of an audit operation to determine if the device had access to the media (processing block 1003). For example, if the log being searched was created as part of a capture process that operated while an individual was performing a task, this process could take a document (or other media), generate a media identifier for it, and the search for that media identifier in the log to determine if the individual looked at the document (because it would have been captured as part of the capture process). Note that time could be captured as well and any search of the log could be based on time as well as the media being sought.

Process Logging

Another example of associations occurs in the context of process logging. Process logging is a technique in which the input, output, machine, and program (or other set of processing operations) that generated the output (result) are certified using document logs. In other words, using process logging, there is a verification chain for almost any output that is the result of a complex set of programs running. The verification chain allows one to verify that each processing step was performed. By doing so, one can avoid having to repeat a processing operation as part of the verification process.

Process logging may be useful for particularly important documents (e.g., financial records). For example, every operation performed to generate a financial record could be recorded for subsequent review. As such, process logging could be part of an Enterprise Content Management (ECM) Standard and/or a Decentralized Document Management Service.

Figure 11:
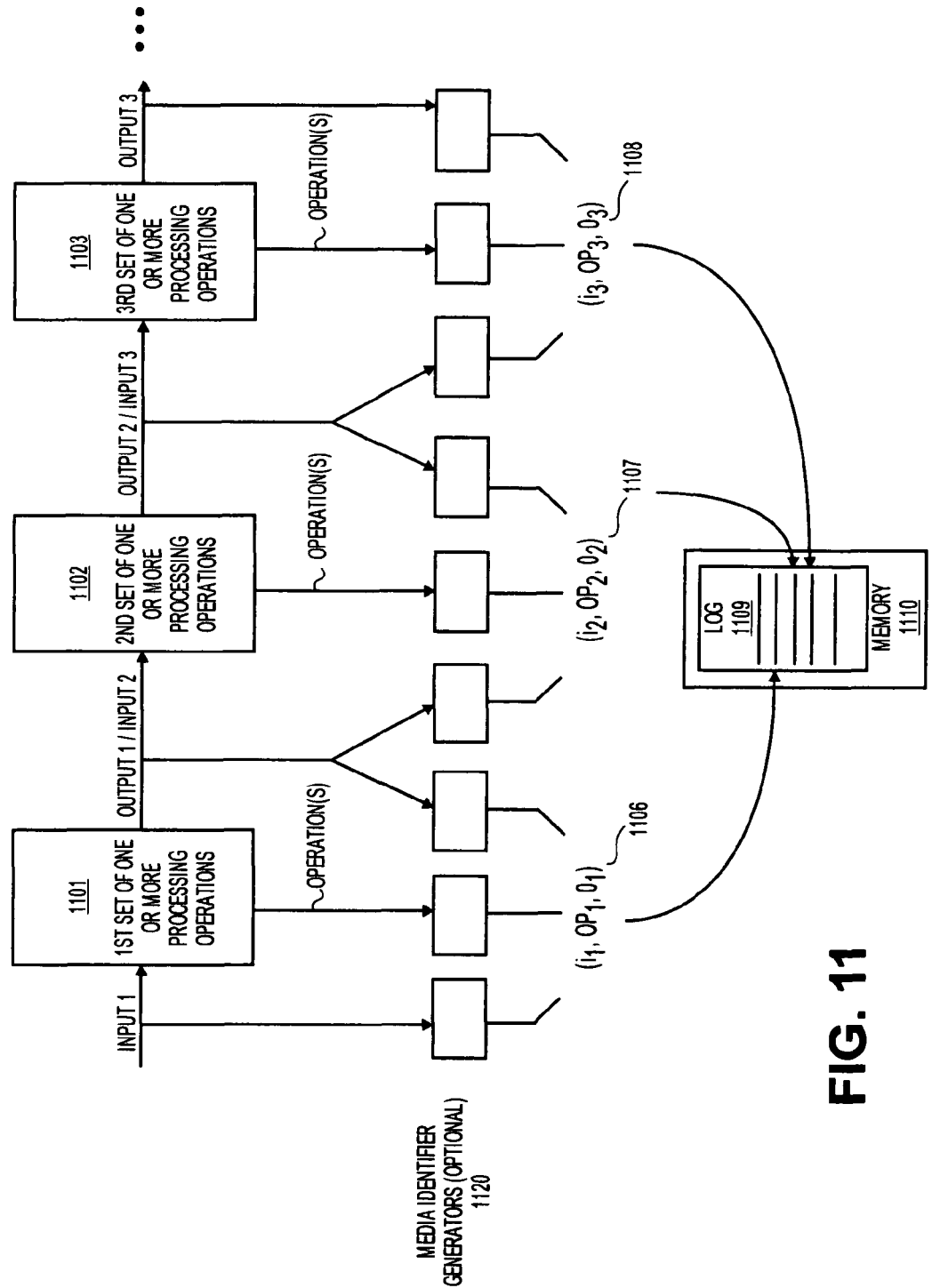
FIG. 11 illustrates an example of process logging.

FIG. 11 illustrates an example of process logging. Referring to FIG. 11, three sets of one or more processing operations 1101-1103 are shown in a cascaded arrangement. Each may comprise a separate program or all three could represent a program, or a portion thereof. Also, the sets of operations 1101-1103 may represent a workflow. Note that only three are used in this example, but those skilled in the art would recognize that more or less than three could be used. Each of these sets of operations may be performed by a process in the computer system or some other computing device.

The input(s), the set(s) of process operation, and output(s) of each of sets 1101-1113 are logged into log 1109, which is stored in memory 1100 as entries 1106-1108. In one embodiment, prior to logging, each are converted into media identifiers (as described above) by media identifier generators 1120. Note that this is not required. In alternative embodiments, media identifiers of one or more of the input, the set of operations and output are generated. Thus, it is possible to have process logging in which inputs, outputs and/or the set of processing operations are stored in the log and may be available for public access.

Figure 12:
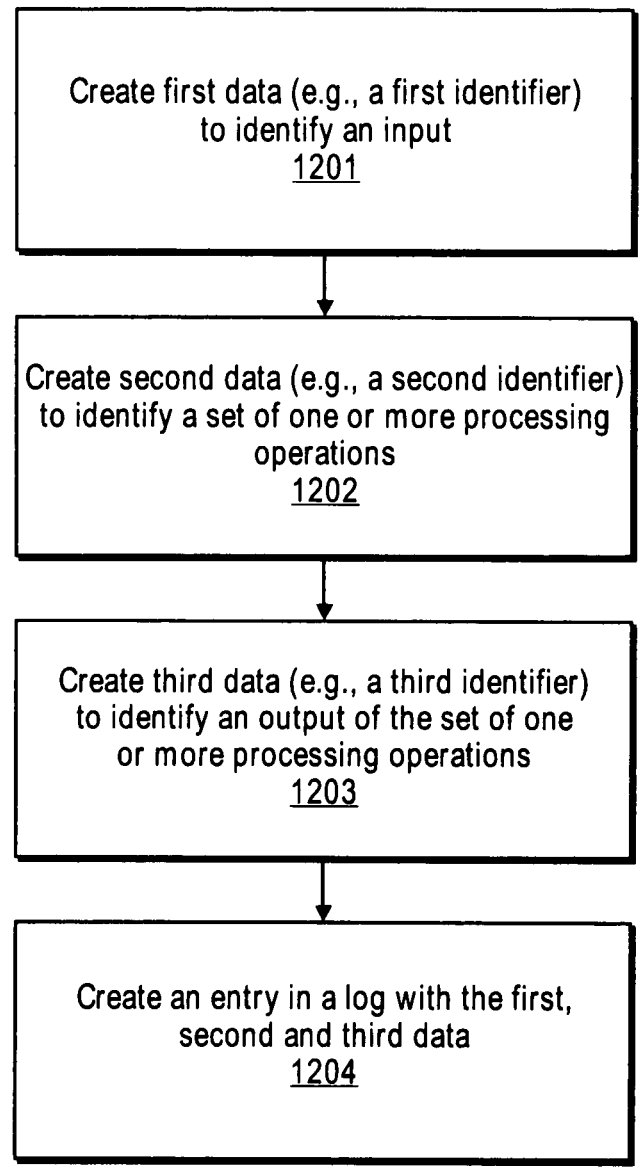
FIG. 12 is a flow diagram of one embodiment of a process for process logging.

FIG. 12 is a flow diagram of one embodiment of a process for process logging. The process is performed by processing logic that may comprise hardware (circuitry, dedicated logic, etc.), software (such as is run on a general purpose computer system or a dedicated machine), or a combination of both.

Referring to FIG. 12, the process begins by processing logic creating a first identifier to identify an input (processing block 1201), creating a second identifier to identify a set of one or more processing operations (processing block 1202) and creating a third identifier to identify an output of the set of one or more processing operations (processing block 1203). In one embodiment, the first identifier is created by applying a first hashing function to information indicative of a set of one or more processing operations, the second identifier is created by applying a second hashing function to information indicative of the input to the set of processing operations, and the third identifier is created by applying a third hashing function to information indicative of the output of the set of processing operations. In one embodiment, the first, second and third hashing functions are identical. Note that in one embodiment, an identifier for at least one of the input, the output and the set of processing operations are not the result of a hash; as discussed above, they may remain readable without any additional processing. In one embodiment, the set of processing operations comprises a program.

After creating the first, second and third identifiers, processing logic creates an entry in a log with the first, second and third identifiers (processing logic 1204).

Subsequently, processing logic verifies the set of processing operations were performed on the media based on results of accessing the log and obtaining information in the entry. That is, once the process log has been created, it may be accessed to enable a review of the processes applied. The review may be used to verify that a process was performed correctly. Such a determination may be made by ensuring that the correct set of one or more operations were performed, and that those operations were performed correctly and using the correct input(s).

If two or more processes are occurring in parallel, it should be apparent that log entangling can be performed on the logs of both processes. Such entangling can establish that two processes are running concurrently to one another, which may have important business or safety implications. For example, if it is clear from entangled process logs that two processes are running concurrently, then this might be used to establish the cause of some failures due to process deadlocking or race conditions. Alternatively, it might be used to detect that certain transactions which were material to completion of a certain task correctly could not have been properly taken into account, because of the timing of two transactions. Time stamp information might not be reliable enough to make such a determination, but the sequential nature of hash chains could be used to determine a sequence among a number of competing processes whose process logs were entangled. For example, the entangled process logs of many different electronic stock trading systems might be used to determine whether certain trades were proper or improper, without any need for one trader to reveal to another what trades were being made. Also the process logs of an airplane's electronic systems might reveal safety flaws in the interactions of those systems.

If an incorrect process has been run, a review of the log can determine this fact at a later time, and the "workflow" recorded in the log could be rerun with either a corrected process or corrected inputs. In one embodiment, the computational steps of the process are reworked to correct errors. For example, by retaining the inputs, the program (or other set of processing operations), the outputs in a log entry, one can determine that one of the inputs is wrong and go back to that step, and produce a new log with the alternative version of the computation. Such a process may be used to perform and retain "what-if?" versions of the same computation.

If a determination is made that the process is wrong, the process may be corrected and new entries may be added to the end of the log. The inclusion of the new entries may be used to indicate that a correction occurred. For example, an indication could be made that one of the log entries was incorrect and a correction may be added to the log (e.g., a mistake was identified in line 35 and the correction is as follows). In this way, another party reviewing the log will know what entries are incorrect and will be able to still obtain the correct result.

Figure 13:
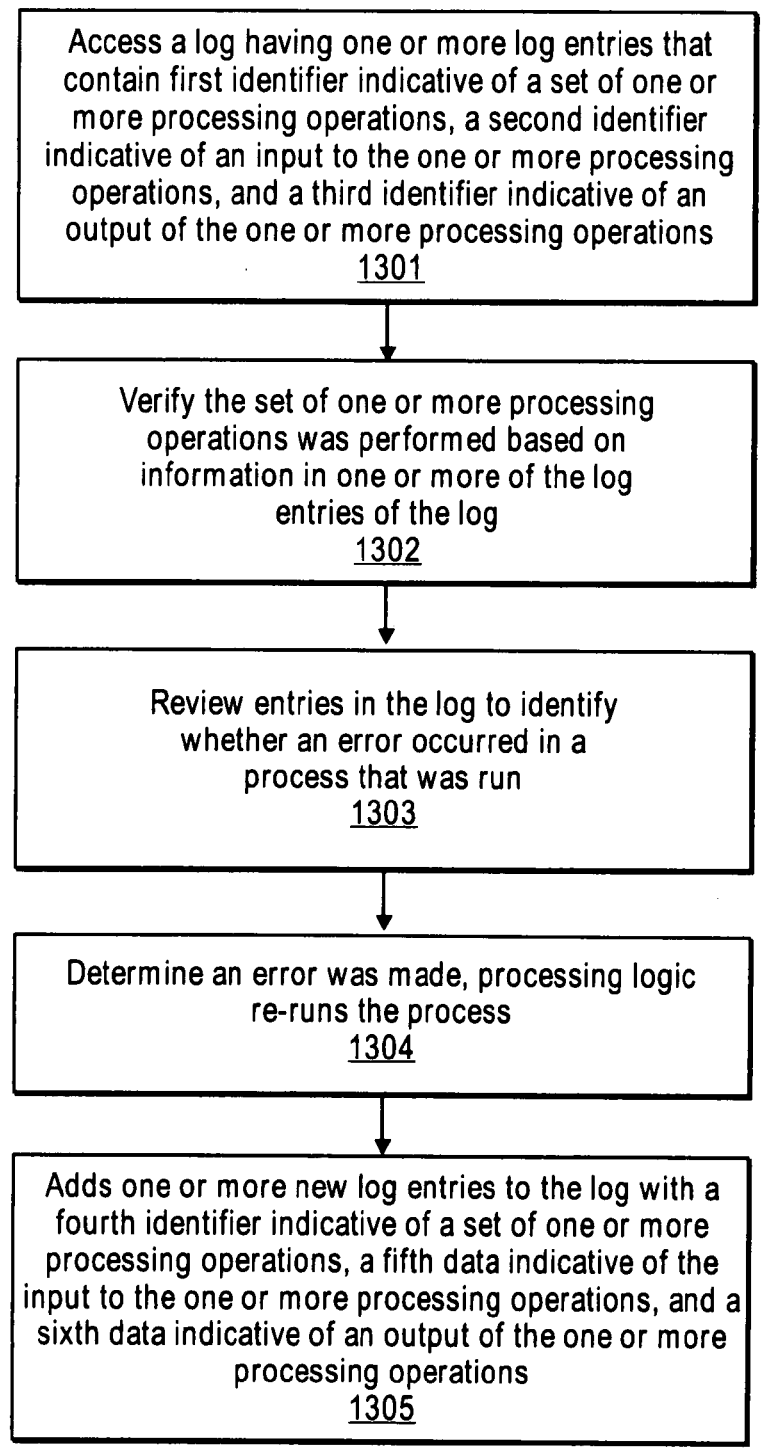
FIG. 13 is a flow diagram of one embodiment of a process for verifying a process was performed correctly.

FIG. 13 is a flow diagram of one embodiment of a process for verifying a process was performed correctly. The process is performed by processing logic that may comprise hardware (circuitry, dedicated logic, etc.), software (such as is run on a general purpose computer system or a dedicated machine), or a combination of both.

Referring to FIG. 13, the process begins by processing logic accessing a log having one or more log entries that contain first, second or third data. In one embodiment, one or more of that first, second, and third data comprises first, second and third media identifiers, respectively, where the first identifier is indicative of a set of one or more processing operations, the second identifier is indicative of an input to the one or more processing operations, and the third identifier is indicative of an output of the one or more processing operations (processing block 1301). In one embodiment, the first, second and third media identifiers are hash values. In one embodiment, the first, second and third media identifiers are a result of applying a hashing function to information indicative of the set of processing operations, information indicative of the input to the set of processing operations, and information indicative of the output of the set of processing operations, respectively. In one embodiment, the hashing function is either the SHA1 cryptographic hash algorithm, the SHA256 cryptographic hash algorithm, or the MD5 hashing algorithm.

In one embodiment, the input is a user input. In one embodiment, the user input is one or a group consisting of a selection of a menu choice, a password, a cursor control device (e.g., mouse) activation, and a pen movement. In another embodiment, the input is media (e.g., a document) and the first media identifier is a media identifier (e.g., a document identifier). In yet another embodiment, the input is a combination of user input and files.

Next, processing logic verifies the set of one or more processing operations was performed based on information in one or more of the log entries of the log (processing block 1302).

Subsequently, processing logic reviews entries in the log to identify whether an error occurred in a process that was run (processing block 1303). As stated above, this may be done to determine whether the processing operations were performed correctly or produced the correct results (i.e., the processing operations were performed correctly on the correct input).

If processing logic determines an error was made, processing logic re-runs the process (processing block 1304) and adds one or more new log entries to the log with a fourth identifier indicative of a set of one or more processing operations, a fifth data indicative of the input to the one or more processing operations, and a sixth data indicative of an output of the one or more processing operations (processing block 1305). The forth, fifth, and sixth data may be media identifiers.

In another embodiment, a review of the log may be used to find the most correct output (e.g., the best answer). In such a case, when processing a log, the answer may be found in one entry of the log, but the review still continues through the log to see if a subsequent entry in the log indicates that the earlier entry is not correct. If no other entry indicates that to be the case, the reviewer knows they have the more correct answer available.

In one embodiment, a result (data) is authenticated without revealing certain information. For example, a server might log the input and outputs of a set of SQL queries on a database. Someone may thus confirm that a query with which they are presented with was made, and did have the results presented, but they cannot obtain information about other queries.

Archival Bitmap

In one embodiment, the use of logs and the logging techniques described above may be used to access and maintain associations with respect to documents for an extended period of time. In one embodiment, one or more associated documents are maintained in the form of bitmaps. The access and maintenance of such documents may be provided as a service. In one embodiment, the service guarantees to maintain the bitmap of a document for a certain period of time (e.g., 100 years). The service updates the bitmap to new formats as needed and always has a current bitmap form of an object, along with a certificate indicating the association between the current bitmap and the initially provided bitmap or media. To maintain a record of the association between the current bitmap and the initially provided bitmap, in one embodiment, a log is maintained to indicate one or more previous versions, hashes, and the operations that were performed between the various versions.

In one embodiment, the service signs a new version of a document as having been generated from an older version (e.g., the original document), thereby certifying its relationship with the older version.

Figure 14:
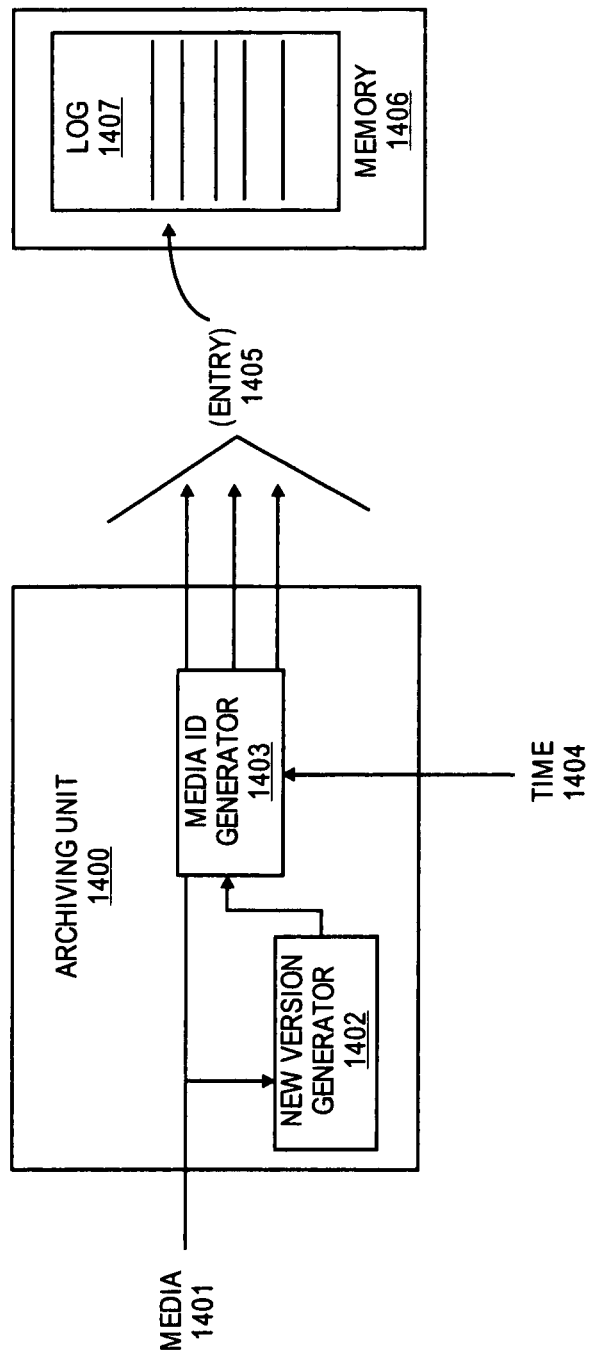
FIG. 14 is a block diagram of one embodiment of an archiving service.

FIG. 14 is a block diagram of one embodiment of an archiving service. Referring to FIG. 14, an archiving unit 1400 receives image 1401. In one embodiment, image 1401 is a bitmap. In one embodiment, archiving unit 1400 includes a media identifier generator 1403 that generates a media identifier for image 1401 that may be stored in log 1407 as part of entry 1405. Entry 1405 may also include a time identifier based on a time the image 1401 was received, indicated by time input 1404, which may or may not be in the form of a media identifier generated by media identifier generator 1403.

In one embodiment, archiving unit 1400 includes a new version generator 1402. In case media 1401 is not a bitmap, new version generator 1402 may be configured to generate a bitmap. Then, the newly generated bitmap, along with media 1401, and optionally the time input 1404, may be input to media identifier generator 1403, which generates media identifiers that are stored in log 1407 as part of entry 1405. In such a case, entry 1405 records the association between image 1401 and the newly generated bitmap.

In another embodiment, media 1401 is a bitmap and new version generator 1402 generates a newer version of bitmap 1401. For example, bitmap 1401 may have been generated with an older version of software and new version generator 1402 may be able to generate a newer version of bitmap 1401 using the latest version of software. As in the previous embodiment, media identifiers can be generated and stored as entry 1405 in log 1407 to record the association between the two versions.

In one embodiment, the service charges a fee to maintain the document and/or versions of the document. Various charging models may be used, including, but not limited to, using a one time fee, or a periodic key (e.g., an annual fee).

Figure 15:
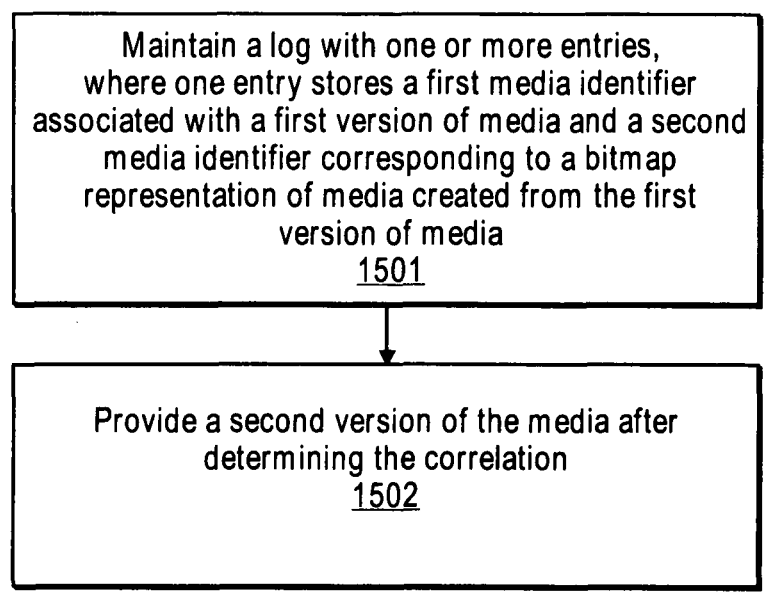
FIG. 15 is a flow diagram of one embodiment of a process for performing archiving using a log.

FIG. 15 is a flow diagram of one embodiment of a process for performing archiving using a log. The process is performed by processing logic that may comprise hardware (circuitry, dedicated logic, etc.), software (such as is run on a general purpose computer system or a dedicated machine), or a combination of both.

Referring to FIG. 15, the process begins by processing logic maintaining a log with one or more entries, where one entry stores a first media identifier associated with a first version of media and a second media identifier corresponding to a bitmap representation of media created from the first version of media (processing block 1501). Subsequently, processing logic accesses the log to determine a correlation between the first version of media and the bitmap of a representation of media. This access and determination may be in response to a user request in which the user provides either the bitmap representation or the first version of the media and is trying to determine if the representation the user is providing is correlated to the other version. In one embodiment, the first version of the media and the bitmap representation of the media are created with two different versions of the same software program. In such a situation, the user may have the representation created by the earlier version and wants the newer version.

In one embodiment, processing logic determines when the first version of media and the bitmap of a representation of media were correlated by accessing the one entry and analyzing time information in the one entry. In one embodiment, the time information is stored in the one entry as a hash value.

In one embodiment, processing logic provides a second version of the media after determining the correlation (processing block 1502). In one embodiment, the second version is a more recent version of the media than the first version.

Figure 16:
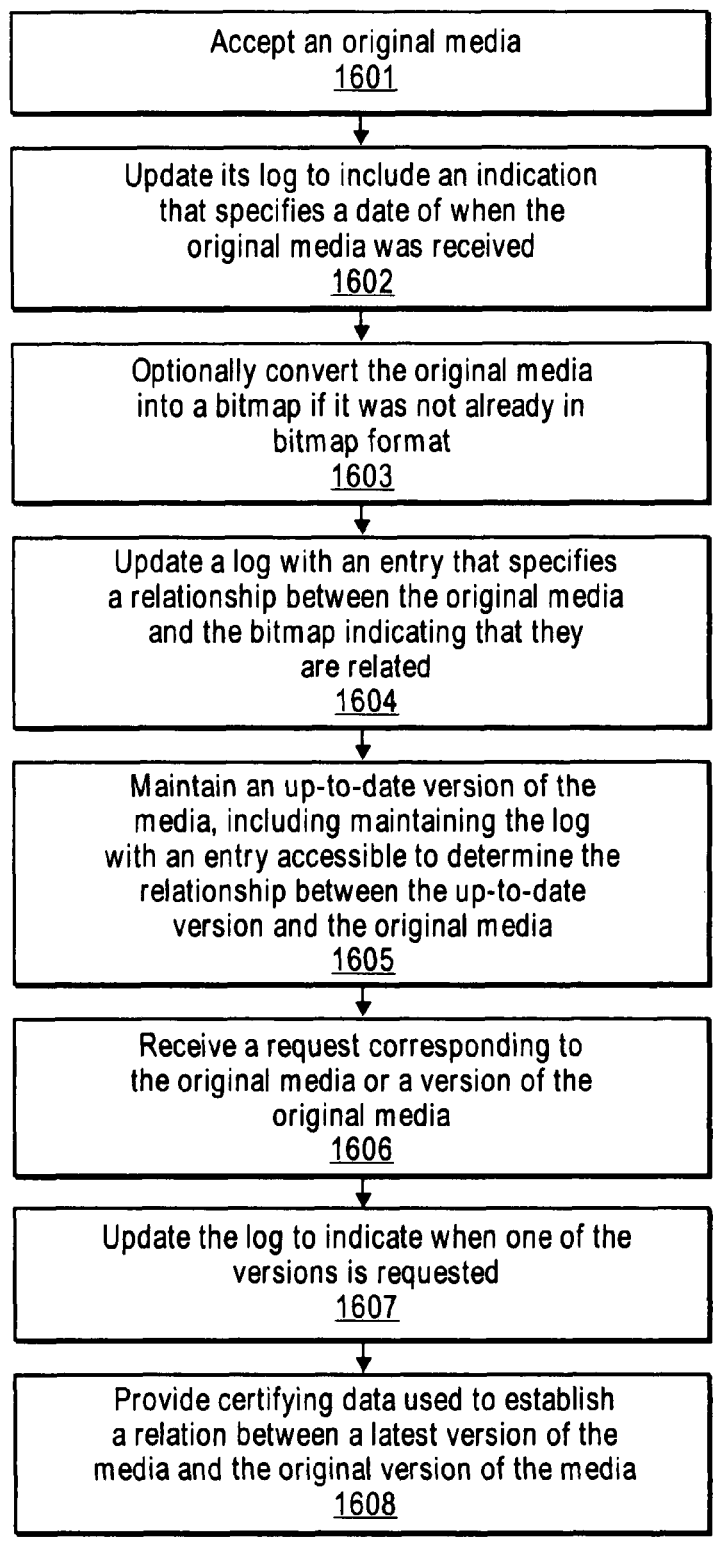
FIG. 16 is a flow diagram of one embodiment of a process for providing an archival service.

In one embodiment, the service provider performs a number of operations to implement the service. FIG. 16 is a flow diagram of one embodiment of a process for providing an archival service. The process is performed by processing logic that may comprise hardware (circuitry, dedicated logic, etc.), software (such as is run on a general purpose computer system or a dedicated machine), or a combination of both.

Referring to FIG. 16, the process begins by accepting an original media (processing block 1601). In one embodiment, the original media is a bitmap of a document, screen shot or some of other image format.

After receiving the media, processing logic updates its log to include an indication that specifies a date of when the original media was received (processing block 1602) and optionally converts the original media into a bitmap if it was not already in bitmap format (processing block 1603).

Once in bitmap form, processing logic updates a log with an entry that specifies a relationship between the original media and the bitmap indicating that they are related (processing block 1604). The entry includes an identifier corresponding to the entry and an identifier corresponding to the media. In one embodiment, the entry specifies a time when the bitmap was created. This log may be the same log into which the date of receipt of the original was received.

Thereafter, optionally, processing logic maintains an up-to-date version of the media, including maintaining the log with an entry accessible to determine the relationship between the up-to-date version and the original media (processing block 1605). In one embodiment, maintaining an up-to-date version is performed in response to receiving a fee.

Optionally, the process also includes processing logic receiving a request corresponding to the original media or a version of the original media (processing block 1606). The request may include the original media and seeks to obtain the current version of the media. The request may attempt to ascertain whether a particular version of the media held by the user is related to the original media or a different version (e.g., an up-to-date version) of the media. In response to the request, in one embodiment, processing logic generates a new media identifier for the received media, searches a log for the new identifier, and provides an indication that the received media is related to one or both of the original media or the bitmap if the second log contains the new identifier. This may be done by providing certifying data such as, for example, a certificate, that establishes a relation between a received media (which may be the latest version of the media) and the original version of the media.

In response to the request, in one embodiment, processing logic updates the log to indicate when one of the versions is requested (processing block 1607). This optional operation may not be performed with all processes.

Processing logic also provides certifying data used to establish a relation between a latest version of the media and the original version of the media (processing block 1608). In one embodiment, the certifying data is a certificate. In one embodiment, processing logic provides the certifying data (e.g., a certificate) in response to receiving a fee.

Figure 17:
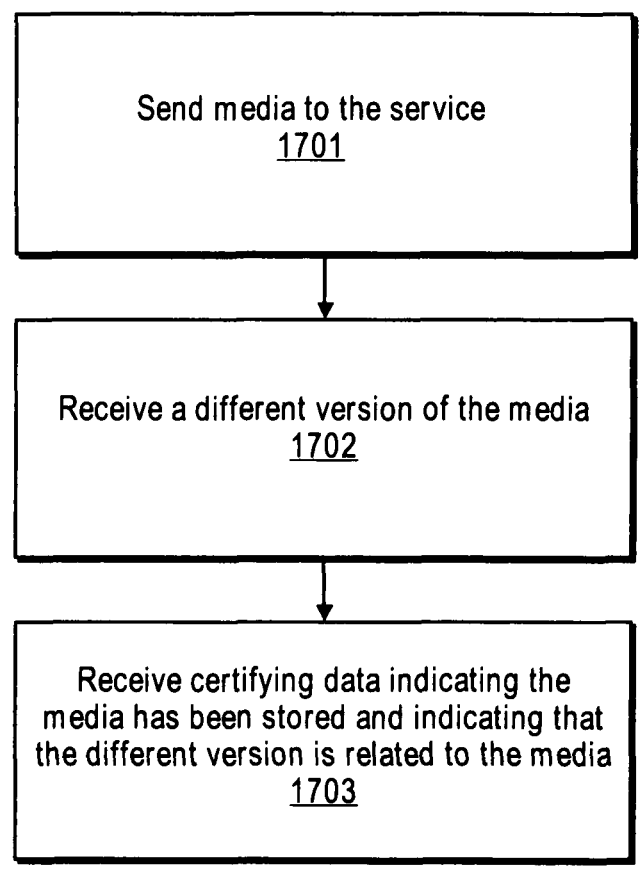
FIG. 17 is a flow diagram of one embodiment of a user process for using the service.

FIG. 17 is a flow diagram of one embodiment of a user process for using the service. The process is performed by processing logic that may comprise hardware (circuitry, dedicated logic, etc.), software (such as is run on a general purpose computer system or a dedicated machine), or a combination of both.

Referring to FIG. 17, the process begins by processing logic sending media to the service (processing block 1701). In return, processing logic receives a different version of the media (processing block 1702) and receives certifying data indicating the media has been stored and indicating that the different version is related to the media (processing block 1703).

An Example of a Computer System

Figure 18:
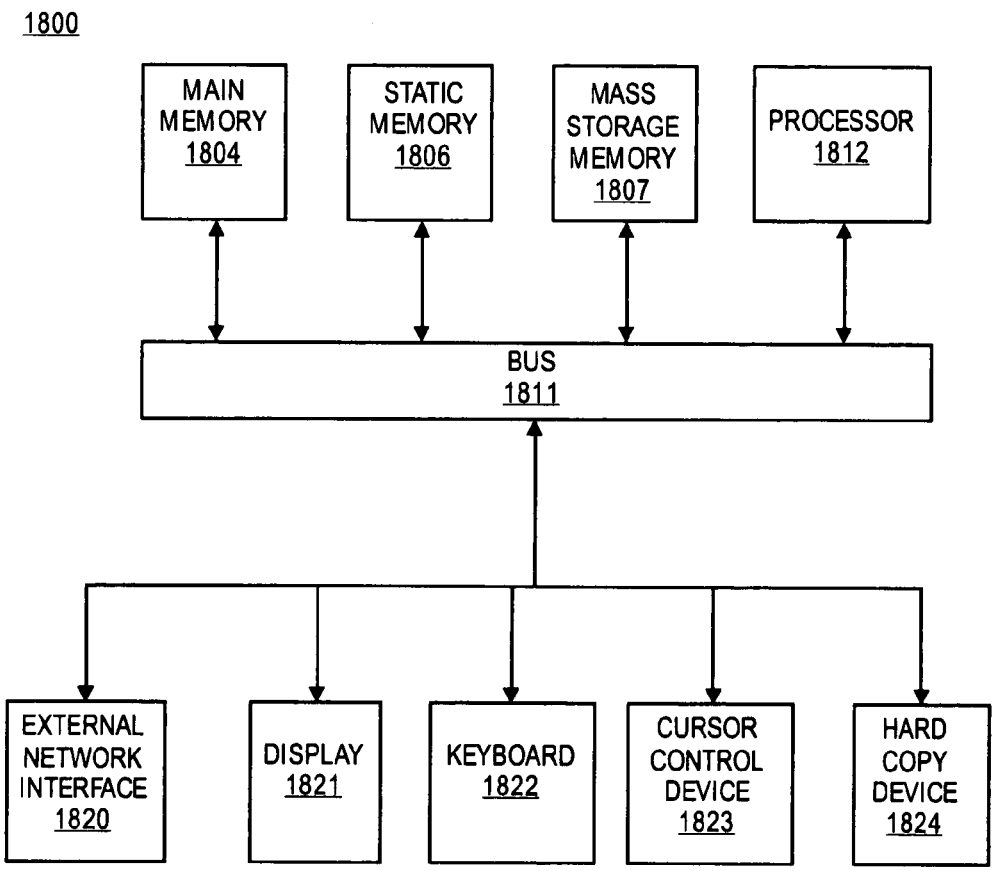
FIG. 18 is a block diagram of a computer system that may perform one or more of the operations described herein.

FIG. 18 is a block diagram of a computer system that may perform one or more of the operations described herein. Referring to FIG. 18, computer system 1800 may comprise an exemplary client or a server computer system. Computer system 1800 comprises a communication mechanism or bus 1811 for communicating information, and a processor 1812 coupled with bus 1811 for processing information. Processor 1812 includes a microprocessor, but is not limited to a microprocessor, such as, for example, Pentium™, etc.

System 1800 further comprises a random access memory (RAM), or other dynamic storage device 104 (referred to as main memory) coupled to bus 1811 for storing information and instructions to be executed by processor 1812. Main memory 1804 also may be used for storing temporary variables or other intermediate information during execution of instructions by processor 1812.

Computer system 1800 also comprises a read only memory (ROM) and/or other static storage device 1806 coupled to bus 1811 for storing static information and instructions for processor 1812, and a data storage device 1807, such as a magnetic disk or optical disk and its corresponding disk drive. Data storage device 1807 is coupled to bus 1811 for storing information and instructions.

Computer system 1800 may further be coupled to a display device 1821, such as a cathode ray tube (CRT) or liquid crystal display (LCD), coupled to bus 1811 for displaying information to a computer user. An alphanumeric input device 1822, including alphanumeric and other keys, may also be coupled to bus 1811 for communicating information and command selections to processor 1812. An additional user input device is cursor control 1823, such as a mouse, trackball, trackpad, stylus, or cursor direction keys, coupled to bus 1811 for communicating direction information and command selections to processor 1812, and for controlling cursor movement on display 1821.

Another device that may be coupled to bus 1811 is hard copy device 1824, which may be used for printing instructions, data, or other information on a medium such as paper, film, or similar types of media. Furthermore, a sound recording and playback device, such as a speaker and/or microphone may optionally be coupled to bus 1811 for audio interfacing with computer system 1800. Another device that may be coupled to bus 1811 is a wired/wireless communication capability 1825 to communication to a phone or handheld palm device.

Note that any or all of the components of system 1800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

accepting an original media;

updating an entry in a first log to include an indication that specifies a date of when the original media was received;

converting the original media into a bitmap, the bitmap being in a format different than that of the original media;

generating, with a processor, identifiers for the original media, the bitmap, and a time when the original media was converted into the bitmap, wherein the identifier for the original media is based at least in part on a rolling hash function applied to a concatenation of a first string of data representing at least a portion of content in the original media and a second string of data representing at least one prior log entry from a second log, the identifier for the bitmap is based at least in part on the rolling hash function applied to a concatenation of a third string of data representing content in the bitmap and a fourth string of data representing at least one prior log entry from the second log, and the identifier for the time when the original media was converted into the bitmap is based on a hash function applied to a value indicative of the time when the original media was converted into the bitmap; and updating the entry in the first log to specify a relationship between the original media and the bitmap indicating that the bitmap was generated from the original media and to specify a date when the bitmap was generated from the original media, wherein the updated entry includes the identifier corresponding to the bitmap, the identifier corresponding to the original media, and the identifier corresponding to the time when the original media was converted into the bitmap, wherein the entry in the first log entangles the first log with the second log.

2. The method defined in claim 1 further comprising updating the first log to indicate when one of the original media or the bitmap is requested.

3. The method defined in claim 2 further comprising providing certifying data used to establish a relation between a latest version of the original media and the original media.

4. The method defined in claim 3 wherein the certifying data is a certificate.

5. The method defined in claim 1 wherein the entry specifies a time when the bitmap was created.

6. The method defined in claim 1 further comprising:
receiving a request with received media, the received media corresponding to one of either the original media or the bitmap;
generating a new identifier for the received media;
searching the second log for the new identifier; and
indicating that the received media is related to one or both of the original media or the bitmap if the second log contains the new identifier.

7. The method defined in claim 1 further comprising maintaining an up-to-date version of the original media, including maintaining the first log with an entry accessible to determine the relationship between the up-to-date version and the original media.

8. The method defined in claim 7 wherein maintaining an up-to-date version is performed in response to receiving a fee.

9. The method defined in claim 7 further comprising:
receiving a fee; and
in response to receiving the fee, providing a certificate indicating that the up-to-date version is related to the original media.

10. An article of manufacture having one or more non-transitory computer-readable storage media storing instructions which, when executed by a system, cause the system to perform a method comprising:
accepting an original media;
updating an entry in a first log to include an indication that specifies a date of when the original media was received;
converting the original media into a bitmap, the bitmap being in a format different than that of the original media;
generating identifiers for the original media, the bitmap, and a time when the original media was converted into the bitmap, wherein the identifier for the original media is based at least in part on a rolling hash function applied to a concatenation of a first string of data representing at least a portion of content in the original media and a second string of data representing at least one prior log entry from a second log, the identifier for the bitmap is based at least in part on the rolling hash function applied to a concatenation of a third string of data representing content in the bitmap and a fourth string of data representing at least one prior log entry from the second log, and the identifier for the time when the original media was converted into the bitmap is based on a hash function applied to a value indicative of the time when the original media was converted into the bitmap; and
updating the entry in the first log to specify a relationship between the original media and the bitmap indicating that the bitmap was generated from the original media and to specify a date when the bitmap was generated from the original media, wherein the updated entry includes the identifier corresponding to the bitmap, the identifier corresponding to the original media, and the identifier corresponding to the time when the original media was converted into the bitmap, wherein the entry in the first log entangles the first log with the second log.

11. The article of manufacture defined in claim 10 wherein the method further comprises:
receiving a request with received media, the received media corresponding to one of either the original media or the bitmap;
generating a new identifier for the received media;
searching the second log for the new identifier; and
indicating, with certifying data, that the received media is related to one or both of the original media or the bitmap if the second log contains the new identifier.

12. The article of manufacture defined in claim 11 wherein the certifying data is a certificate.

13. A method comprising:
receiving a first version of media;
converting the first version of media into a bitmap representation of media;
maintaining, with a processor, a first log with one or more entries, including one entry to store a first media identifier associated with the first version of media, a second media identifier corresponding to the bitmap representation of media, an identifier for a time when the first version of media was converted into the bitmap representation of media, and data that specifies a correlation between the first version of media and the bitmap representation of media indicating one or more operations performed on the first version of media to generate the bitmap representation of media, wherein the first media identifier is generated from application of a rolling hash function applied to a concatenation of a first string of data representing the first version of media and a second string of data representing at least one prior log entry from a second log, the second media identifier is generated from application of the rolling hash function applied to a concatenation of a third string of data representing the bitmap representation of media and a fourth string of data representing at least one prior log entry from the second log, and the identifier for the time when the first version of media was converted into the bitmap representation of media is based on a hash function applied to a value indicative of the time when the first version of media was converted into the bitmap representation of media, wherein the one entry entangles the first log with the second log;
receiving a user request to determine a correlation between different versions of media, wherein the request includes the first version of media or the bitmap representation of media; and
in response to receipt of the user request, determining when the first version of media and the bitmap representation of media were correlated based on accessing the one entry in the first log.

14. The method defined in claim 13 wherein determining when the first version of media and the bitmap representation of media were correlated comprises accessing the one entry and analyzing time information in the one entry.

15. The method defined in claim 13 further comprising providing a second version of the media after determining the correlation.

16. The method defined in claim 15 wherein the second version is a more recent version of the first version of media.

17. The method defined in claim 13 wherein the first version of the media and the bitmap representation of media are created with two different versions of the same software program.

* * * * *